H. BROWN.
INDICATOR FOR ENGINES.
APPLICATION FILED NOV. 24, 1917.
1,306,575.
Patented June 10, 1919.
2 SHEETS—SHEET 1.
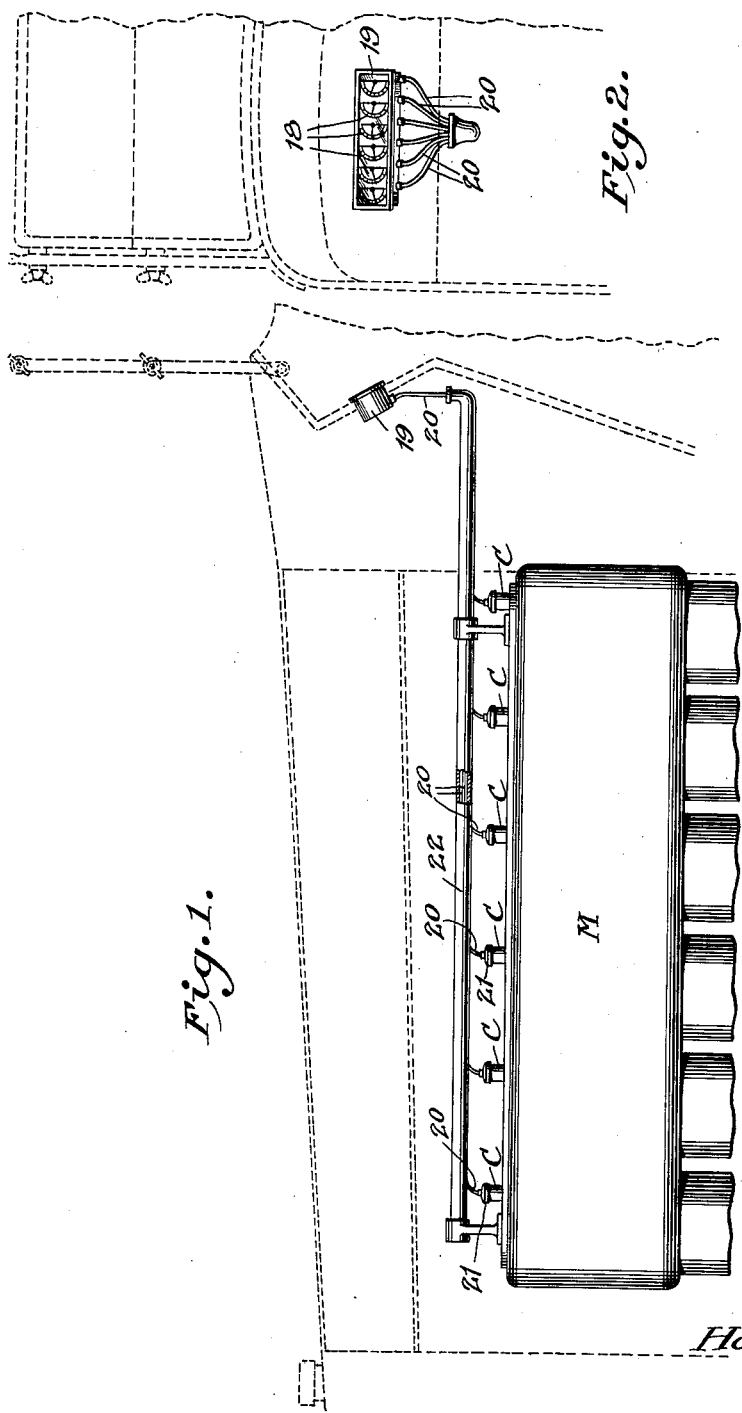
Inventor
Harold Brown
By Mason Fenwick Lawrence,
Attorneys

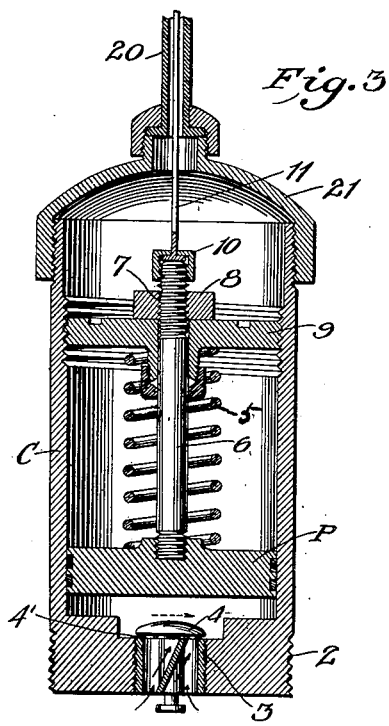
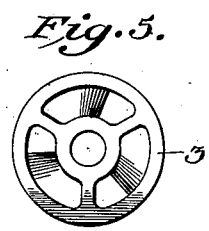

UNITED STATES PATENT OFFICE.

HAROLD BROWN, OF DACOMA, OKLAHOMA.

INDICATOR FOR ENGINES.

1,306,575.  Specification of Letters Patent.  Patented June 10, 1919.

Application filed November 24, 1917. Serial No. 203,797.

*To all whom it may concern:*

Be it known that I, HAROLD BROWN, a citizen of the United States, residing at Dacoma, in the county of Woods and State of Oklahoma, have invented certain new and useful Improvements in Indicators for Engines; and I do hereby declare the following to be a full, clear, and exact description of the invention, such as will enable others skilled in the art to which it appertains to make and use the same.

This invention relates to indicators and more particularly to an indicating apparatus for use in combination with automobile or cylinder engines of various types.

It is one of the objects of the present invention to provide an apparatus including a gage which latter is operated by variations of pressure in the cylinder or cylinders of the engine to which the apparatus may be connected, first to facilitate the location of various causes of loss of pressure in the cylinder or cylinders of the engine and has for a further object the provision of means whereby the normal or working pressures of each of the cylinders of the engine and various conditions of operation may be readily ascertained.

With these and other objects in view, as will be rendered manifest in the following specification, and readily understood by those skilled in the art, the invention consists in the construction, combinations of the parts, and in details of the organization, as will be more fully described hereinafter, a form of the invention being illustrated in the accompanying drawing, wherein, Figure 1 is a side elevation of a portion of a six cylinder engine of the internal combustion type to which the apparatus is applied, Fig. 2 is a front elevation of the organization of gages as disposed adjacent the operator's station or dashboard of an automobile, Fig. 3 is an enlarged detail view in section centrally through the gage piston chamber and parts thereof, and Fig. 4 is a front view partly in section of one of the gages, and Fig. 5 is a plan view of the valve cage.

Loss of pressure and inefficiency of operation of motors especially of the internal combustion engine type result in various conditions, such for instance, as the sticking of the valve, broken piston rings, leaky valves, absence of oil in the cylinder, inefficient packing of the ring, which several conditions determine the degree to which a charge of fuel may be compressed in a cylinder. In the event that compression may be good in an engine, low combustion pressures may result from a number of causes, such for instance, as the absence of ignition in any one or more of the cylinders, or poor ignition, or from the insufficiency of a spark, or owing to the condition of the ring, or to leaky valves, or also to the poor condition of the mixture of the fuel, and my invention particularly contemplates the provision of an apparatus which will approximately indicate the loss of pressure from the various causes, and will indicate the average compression in each of the cylinders prior to ignition of the fuel, and will indicate the average depression or explosion of the fuel mixture units of the cylinder. To that end, I have shown as connected to each of the cylinders of a motor M, a chamber C which is shown as provided with threads 2 for connection to the cylinders of the engine or may be otherwise connected as desired, the cylinder having introduced therein a valve seat or cage 3 at its lower end, in which cage is a valve 4 which, while it is adapted to be lifted by pressure in an engine cylinder, will, when it is seated, allow for the gradual loss of pressure by leakage from the chamber C beneath a piston P operating in the chamber C and normally forced downwardly or toward the valve by means of a spring 5 surrounding a piston rod 6 connected to the piston P. The upper end of this rod is threaded as at 7 to receive a nut 8 which rests upon an adjustable disk 9 threaded in the upper end of the chamber C. The piston rod 6 is shown as connected at 10 to the adjacent end of a rod or wire member 11, the opposite end of which is connected as at 12 to an element 13 including a rack 14 which engages a pinion 15 on an arbor 16 carrying an indicating pointer 17 which latter is adapted to be actuated from an idle position over a suitably indexed gage or dial plate 18.

A number of these gages may be grouped, Fig. 2, and disposed adjacent to the operator, as for instance, at the dash-board of an automobile so as to be conveniently in view during the operation of the engine. As it is desirable to utilize light and inexpensive connecting devices between the gages and the pistons P, these devices are protected against injury by being arranged within tubes 20 connected to engage housing 19 at one end, and at the opposite end, to a cap 21 threaded or otherwise connected to the upper end of a piston chamber C, the cap 21 being preferably so connected to the end of its respective tube 20 that it may be disconnected therefrom and shifted along the same or removed as desired, to permit ready access to and adjustment of the parts within the chamber C.

The tubes 20 inclosing the gage operating member, may also, if desired, be incased in a suitable form of housing, indicated at 22, extending along the top or side of the motor as may be desired, and leading to the location of the operator's station or dash-board of the vehicle, in the event that the motor is utilized in an automobile.

In order to keep down the accumulation of carbon, between the check valve 4 and the seat or cage 3, suitable means may be employed for the utilization of the fluid pressure to rotate the valve 4 during the action of the device and which may be accomplished for instance, by disposing the ducts in the valve cage 3 at an incline, with relation to the axis of the valve 4 so as to direct the fluid under pressure at an angle against the lower face of the valve 4 and thereby cause the latter to be rotated with a resulting grinding action in lifting and seating, thus cutting out the carbon. The valve 4 may be prevented from making a perfect closure at its seat on the seat or cage 3 by any suitable means, as for instance, by the burring or roughening of the lower surface of the valve or the upper surface of its seat as is indicated at 4'.

While the valve dial 18 may be indexed in any suitable and preferred manner, it is shown in Fig. 4 as divided into sections which are variously lettered according to their location to indicate whether the loss of pressure during preliminary compression is due to stuck valve, broken ring, or to leaky valves, or the absence of oil or poor rings. A further portion of the valve indicating ring 18 is shown as marked "No ignition," "Poor ignition," "Poor rings," "Leaky valve" and "For mixture" and therefore when the pointer 17 has been actuated through movement of the piston P of any cylinder to one or another of these different index positions on the gage dial, the approximate cause of the trouble may be readily located. It is understood that the indicating legends on the dial are purely arbitrary, and that any other suitable legends or data may be employed in lieu thereof.

As the valve 4 controlling the escape of pressure from beneath the piston P is designed not to make a perfect seat upon the gage or seat member 3, it will be apparent that an average pressure will be maintained beneath each piston P in the operation of the engine, so as to indicate through means of the pressure gage, the average normal compression in the cylinders of the engine prior to explosion, and will also subsequently indicate the average normal working pressures of each of the cylinders of the engine in the event of ignition of the gases or mixture therein, the pressure in each instance being permitted to fall gradually from beneath the piston P of the respective cylinder during the operation of the motor.

What is claimed is:

1. Pressure indicating means for internal combustion engines, comprising, in combination with a cylinder; a gage having an appropriate index; and a pointer movable thereover; a piston and a chamber in which it is operable by pressure from the cylinder; a check-return valve below the piston; a piston rod for the piston having an adjustable stop; an adjustable head in the chamber through which the rod runs; a spring reacting between the piston and said head to return the former to a position limited by the stop on the rod engaging the adjustable head, the said stop providing for adjustment of the resistance of the spring and the said head providing for adjustment of the piston without affecting the setting of the stop; and means connecting the piston rod and the pointer.

2. Pressure indicating means for internal combustion engines, comprising, in combination with a cylinder; a gage having an appropriate index; and a pointer movable thereover; a piston and a chamber in which it is operable by pressure from the cylinder; a check-return valve below the piston; a piston rod for the piston having an adjustable stop; an adjustable head in the chamber through which the rod runs; a spring reacting between the piston and said head to return the former to a position limited by the stop on the rod engaging the adjustable head, the said stop providing for adjustment of the resistance of the spring and the said head providing for adjustment of the piston without affecting the setting of the stop; and means connecting the piston rod and the pointer, the said rod and stop being complementarily threaded.

3. Pressure indicating means for internal combustion engines, comprising, in combination with a cylinder; a gage having an appropriate index; and a pointer movable thereover; a piston and a chamber in which it is operable by pressure from the cylinder; a check-return valve below the piston; a piston rod for the piston having an adjustable stop; an adjustable head in the chamber through which the rod runs; a spring reacting between the piston and said head to return the former to a position limited by the stop on the rod engaging the adjustable head, the said stop providing for adjustment of the resistance of the spring and the said head providing for adjustment of the piston without affecting the setting of the stop; and means connecting the piston rod and the pointer, the said rod and stop being complementarily threaded, and including a member engaging the threaded rod for detachably connecting the pointer connections thereto.

4. Pressure indicating apparatus for internal combustion engine, comprising, in combination with a cylinder, a gage having an appropriate index, and a pointer movable thereover, a tube connected to the gage, a piston chamber connecting the tube to such cylinder and having a yielding piston, a valve between the cylinder and between such chamber, and a connection between said piston and the gage pointer whereby variation of pressure in the engine cylinder is indicated at the gage by action of the piston, the connections protected by and guided in such tube.

In testimony whereof I affix my signature.

HAROLD BROWN.